United States Patent
Lange et al.

(10) Patent No.: US 8,145,509 B2
(45) Date of Patent: Mar. 27, 2012

(54) CORPORATE OWNED LIFE INSURANCE PRODUCT WITH DEATH BENEFITS

(75) Inventors: Jeffrey S. Lange, New York, NY (US); Jeffrey M. Lewis, New York, NY (US)

(73) Assignee: Guggenheim Partners, LLC, New York, NY (US)

( * ) Notice: Subject to any disclaimer, the term of this patent is extended or adjusted under 35 U.S.C. 154(b) by 332 days.

(21) Appl. No.: 12/579,685

(22) Filed: Oct. 15, 2009

(65) Prior Publication Data

US 2010/0262438 A1    Oct. 14, 2010

Related U.S. Application Data

(60) Provisional application No. 61/196,151, filed on Oct. 15, 2008.

(51) Int. Cl.
*G06Q 40/00* (2012.01)
*G06Q 10/00* (2012.01)
*G06Q 50/00* (2012.01)

(52) U.S. Cl. ............... 705/4; 705/2; 705/3; 705/36 R

(58) Field of Classification Search .......... 705/2, 3, 705/4, 36 R
See application file for complete search history.

(56) References Cited

U.S. PATENT DOCUMENTS

| | | | |
|---|---|---|---|
| 2005/0216316 A1* | 9/2005 | Brisbois et al. | 705/4 |
| 2006/0271459 A1* | 11/2006 | Lange | 705/35 |
| 2009/0299767 A1* | 12/2009 | Michon et al. | 705/3 |

OTHER PUBLICATIONS

Schnurr, Rick, "A Layman's Guide to Corporate-Owned Life Insurance", published in the Jul. 2008 issue of the Actuarial Practice Forum, pp. 1-57, copyright 2008 by the Society of Actuaries.

* cited by examiner

*Primary Examiner* — Neal Sereboff
(74) *Attorney, Agent, or Firm* — Edwards Wildman Palmer LLP; Peter C. Schechter; George N. Chaclas

(57) ABSTRACT

A corporate owned life insurance product with death benefits (COLI-DB) that has no cash value and is minimally funded. The policy holder selects an election to mark to market accounting for life insurance. Thus, the COLI-DB has no cash surrender value. The net present value of the COLI-DB can be more than zero (and quite high) so there is no impact to net income and there may even be net income in the first year. The COLI-DB system may optimize returns by using new accounting rules in contrast to the traditional approach of COLI-CV, and returning death benefits through a captive to increase returns.

15 Claims, 14 Drawing Sheets

ACCOUNTING COMPARISON - TRADITIONAL CASH VALUE CENTRIC PRODUCT

| | POLICY ILLUSTRATION | | FTB 85-4 | | FAS 157 | |
|---|---|---|---|---|---|---|
| YEAR | PREMIUM | CASH SURRENDER VALUE | DEATH BENEFIT | ANNUAL IMPACT | ASSET VALUE | ANNUAL IMPACT | ASSET VALUE |
| 1 | 25,000 | 26,320 | 562,797 | 1,320 | 26,320 | (13,305) | 11,695 |
| 2 | 25,000 | 53,744 | 562,797 | 2,425 | 53,744 | 4,226 | 40,921 |
| 3 | 25,000 | 82,320 | 562,797 | 3,576 | 82,320 | 5,547 | 71,468 |
| 4 | 25,000 | 112,158 | 562,797 | 4,838 | 112,158 | 7,052 | 103,519 |
| 5 | 25,000 | 143,255 | 562,797 | 6,097 | 143,255 | 8,534 | 137,053 |
| 6 | 25,000 | 175,775 | 562,797 | 7,520 | 175,775 | 10,249 | 172,302 |
| 7 | 25,000 | 209,686 | 625,182 | 8,911 | 209,686 | 11,960 | 209,262 |
| 8 | 25,000 | 244,402 | 1,055,209 | 9,716 | 244,402 | 12,387 | 246,649 |
| 9 | 25,000 | 280,999 | 1,055,209 | 11,597 | 280,999 | 14,566 | 286,215 |
| 10 | 25,000 | 319,578 | 1,055,209 | 13,579 | 319,578 | 16,815 | 328,030 |

FIG. 2A

| | POLICY ILLUSTRATION | | | FAS 157 | |
|---|---|---|---|---|---|
| YEAR | PREMIUM | CASH SURRENDER VALUE | DEATH BENEFIT | ANNUAL IMPACT | ASSET VALUE |
| 1 | 8,083 | 0 | 1,008,487 | 67,348 | 75,431 |
| 2 | 0 | 0 | 1,008,911 | 4,776 | 80,207 |
| 3 | 0 | 0 | 1,009,357 | 4,909 | 85,115 |
| 4 | 1,400 | 0 | 1,011,295 | 5,147 | 91,662 |
| 5 | 3,000 | 0 | 1,015,009 | 5,394 | 100,056 |
| 6 | 3,200 | 0 | 1,019,120 | 5,872 | 109,129 |
| 7 | 3,300 | 0 | 1,023,541 | 6,295 | 118,724 |
| 8 | 3,500 | 0 | 1,028,393 | 6,752 | 128,976 |
| 9 | 3,900 | 0 | 1,033,908 | 7,249 | 140,124 |
| 10 | 4,300 | 0 | 1,040,118 | 7,700 | 152,125 |

FIG. 2B

| SPOT | CUSHION | STRIKE | NUMBER OF YEARS | VOLATILITY | RISK FREE RATE | DIVIDEND YIELD | PUT PRICE | PMT |
|---|---|---|---|---|---|---|---|---|
| 100 | 10 | 90 | 30 | 8% | 4% | 6% | 2.3929 | 0.2550 |
| 100 | 15 | 85 | 30 | 8% | 4% | 6% | 1.8728 | 0.1996 |
| 100 | 20 | 80 | 30 | 8% | 4% | 6% | 1.4260 | 0.1519 |
| 100 | 25 | 75 | 30 | 8% | 4% | 6% | 1.0513 | 0.1120 |
| 100 | 10 | 90 | 30 | 10% | 4% | 6% | 3.5628 | 0.3796 |
| 100 | 15 | 85 | 30 | 10% | 4% | 6% | 2.9364 | 0.3129 |
| 100 | 20 | 80 | 30 | 10% | 4% | 6% | 2.3734 | 0.2529 |
| 100 | 25 | 75 | 30 | 10% | 4% | 6% | 1.8750 | 0.1998 |
| 100 | 10 | 90 | 30 | 15% | 4% | 6% | 6.5849 | 0.7016 |
| 100 | 15 | 85 | 30 | 15% | 4% | 6% | 5.7707 | 0.6149 |
| 100 | 20 | 80 | 30 | 15% | 4% | 6% | 5.0006 | 0.5328 |
| 100 | 25 | 75 | 30 | 15% | 4% | 6% | 4.2772 | 0.4557 |
| 100 | 10 | 90 | 30 | 20% | 4% | 6% | 9.5445 | 1.0170 |
| 100 | 15 | 85 | 30 | 20% | 4% | 6% | 8.5960 | 0.9159 |
| 100 | 20 | 80 | 30 | 20% | 4% | 6% | 7.6795 | 0.8183 |
| 100 | 25 | 75 | 30 | 20% | 4% | 6% | 6.7973 | 0.7243 |
| 100 | 10 | 90 | 30 | 30% | 4% | 6% | 14.8841 | 1.5859 |
| 100 | 15 | 85 | 30 | 30% | 4% | 6% | 13.7386 | 1.4639 |
| 100 | 20 | 80 | 30 | 30% | 4% | 6% | 12.6112 | 1.3438 |
| 100 | 25 | 75 | 30 | 30% | 4% | 6% | 11.5034 | 1.2257 |
| 100 | 10 | 90 | 30 | 40% | 4% | 6% | 19.1920 | 2.0450 |
| 100 | 15 | 85 | 30 | 40% | 4% | 6% | 17.9064 | 1.9080 |
| 100 | 20 | 80 | 30 | 40% | 4% | 6% | 16.6312 | 1.7721 |
| 100 | 25 | 75 | 30 | 40% | 4% | 6% | 15.3675 | 1.6374 |
| 100 | 10 | 90 | 30 | 50% | 4% | 6% | 22.4009 | 2.3869 |
| 100 | 15 | 85 | 30 | 50% | 4% | 6% | 21.0164 | 2.2393 |
| 100 | 20 | 80 | 30 | 50% | 4% | 6% | 19.6379 | 2.0925 |
| 100 | 25 | 75 | 30 | 50% | 4% | 6% | 18.2660 | 1.9463 |

FIG. 3

| BALANCE SHEET | | | | ( MIL OF USD ) | PAGE 9/10 |
|---|---|---|---|---|---|
| PRU US | | PRUDENTIAL FINANCIAL INC | | | |
| | 12/2008 | 12/2007 | | 12/2008 | 12/2007 |
| | | | CLAIMS & LOSS RES | .00 | .00 |
| | | | PREMIUM RESERVES | .00 | .00 |
| | | | LIFE POLICY BEN | 221564.00 | 195622.00 |
| ST INVESTMENTS | 182323.00 | 185164.00 | OTH INSURANCE RES | 148765.00 | 199244.00 |
| LOANS & MORTGAGES | 42817.00 | 39384.00 | TOT INSURANCE RES | 370329.00 | 394866.00 |
| FIXED INCOME SEC | 3808.00 | 3548.00 | | | |
| EQUITY SECURITIES | 6065.00 | 8580.00 | ST BORROWINGS | 18455.00 | 27098.00 |
| REAL ESTATE INVEST | .00 | .00 | OTHER ST LIAB | 4620.00 | 11417.00 |
| OTHER INVESTMENTS | 7012.00 | 6431.00 | LT BORROWINGS | 20290.00 | 14101.00 |
| TOTAL INVESTMENTS | 242025.00 | 243107.00 | OTHER LT LIAB | 17895.00 | 14875.00 |
| | | | TOTAL LIABILITIES | 431589.00 | 462357.00 |
| CASH & NEAR CASH | 15028.00 | 11060.00 | PREFERRED EQUITY | .00 | .00 |
| NET RECEIVABLES | 2266.00 | 4293.00 | MINORITY INTEREST | .00 | .00 |
| | | | POLICYHOLDERS'EQTY | .00 | .00 |
| NET FIXED ASSETS | | | SHARE CAP & APIC | 21918.00 | 20862.00 |
| DEF POLICY ACQ CST | 15126.00 | 12339.00 | RETAINED EARNINGS | -8496.00 | 2595.00 |
| OTHER ASSETS | 170566.00 | 215015.00 | SHAREHOLDERS EQUIT | 13422.00 | 23457.00 |
| TOTAL ASSETS | 445011.00 | 485814.00 | TOT LIAB & EQUITY | 445011.00 | 485814.00 |
| | | | SHARES OUTSTANDING | 421.30 | 447.40 |

FIG. 4

| EOY AGE | COL 1 PREMIUM | COL 2 DEATH BENEFIT | COL 3 FORCE OF MORTALITY | COL 4 Pr(SURVIVE TO T) | COL 5 Pr(DIE IN T) | COL 6 EXPECTED CF(T) |
|---|---|---|---|---|---|---|
| 59 | $ 10,000 | $ 1,010,500 | 0.00126 | 0.99874 | 0.0013 | (8,714.17) |
| 60 | $ 9,000 | $ 1,020,475 | 0.00200 | 0.9967 | 0.0020 | (6,932.30) |
| 61 | $ 8,000 | $ 1,029,899 | 0.00260 | 0.9942 | 0.0026 | (5,284.19) |
| 62 | $ 10,000 | $ 1,041,894 | 0.00320 | 0.9910 | 0.0032 | (6,595.14) |
| 63 | $ 12,000 | $ 1,056,588 | 0.00380 | 0.9872 | 0.0038 | (7,867.67) |
| 64 | $ 14,000 | $ 1,074,118 | 0.00440 | 0.9829 | 0.0043 | (9,094.40) |
| 65 | $ 15,000 | $ 1,093,574 | 0.00520 | 0.9777 | 0.0051 | (9,077.12) |
| 66 | $ 16,000 | $ 1,115,052 | 0.00600 | 0.9719 | 0.0059 | (9,008.68) |
| 67 | $ 19,000 | $ 1,140,755 | 0.00690 | 0.9652 | 0.0067 | (10,688.47) |
| 68 | $ 20,000 | $ 1,168,793 | 0.00800 | 0.9575 | 0.0077 | (10,124.38) |
| 69 | $ 23,000 | $ 1,201,382 | 0.00920 | 0.9486 | 0.0088 | (11,236.39) |
| 70 | $ 26,000 | $ 1,238,751 | 0.01060 | 0.9386 | 0.0101 | (11,946.91) |
| 71 | $ 29,000 | $ 1,281,139 | 0.01210 | 0.9272 | 0.0114 | (12,339.96) |
| 72 | $ 32,000 | $ 1,328,796 | 0.01380 | 0.9144 | 0.0128 | (12,258.98) |
| 73 | $ 35,000 | $ 1,381,986 | 0.01570 | 0.9001 | 0.0144 | (11,662.13) |
| 74 | $ 40,000 | $ 1,443,085 | 0.01790 | 0.8840 | 0.0161 | (12,108.60) |
| 75 | $ 45,000 | $ 1,512,489 | 0.02040 | 0.8659 | 0.0180 | (11,692.47) |
| 76 | $ 51,000 | $ 1,591,664 | 0.02330 | 0.8458 | 0.0202 | (11,019.86) |
| 77 | $ 58,000 | $ 1,682,147 | 0.02660 | 0.8233 | 0.0225 | (9,905.63) |
| 78 | $ 23,000 | $ 1,740,404 | 0.03030 | 0.7983 | 0.0249 | 25,052.87 |
| 79 | $ 26,000 | $ 1,804,725 | 0.03450 | 0.7708 | 0.0275 | 29,665.53 |
| 80 | $ 28,000 | $ 1,874,361 | 0.03920 | 0.7406 | 0.0302 | 35,897.04 |
| 81 | $ 32,000 | $ 1,951,679 | 0.04450 | 0.7076 | 0.0330 | 41,674.19 |
| 82 | $ 36,000 | $ 2,037,063 | 0.05070 | 0.6717 | 0.0359 | 48,898.70 |
| 83 | $ 39,000 | $ 2,129,866 | 0.05770 | 0.6330 | 0.0388 | 57,865.36 |
| 84 | $ 43,000 | $ 2,231,509 | 0.06550 | 0.5915 | 0.0415 | 67,082.68 |
| 85 | $ 48,000 | $ 2,343,485 | 0.07240 | 0.5487 | 0.0428 | 74,024.01 |
| 86 | $ 54,000 | $ 2,467,359 | 0.08070 | 0.5044 | 0.0443 | 82,014.34 |
| 87 | $ 59,000 | $ 2,602,677 | 0.09000 | 0.4590 | 0.0454 | 91,071.41 |
| 88 | $ 68,000 | $ 2,754,211 | 0.10030 | 0.4130 | 0.0460 | 98,718.60 |
| 89 | $ 76,000 | $ 2,921,721 | 0.11210 | 0.3667 | 0.0463 | 107,391.33 |
| 90 | $ 85,000 | $ 3,107,057 | 0.12530 | 0.3207 | 0.0459 | 115,490.83 |
| 91 | $ 94,000 | $ 3,311,110 | 0.13930 | 0.2761 | 0.0447 | 121,985.25 |
| 92 | $ 106,000 | $ 3,537,966 | 0.15630 | 0.2329 | 0.0431 | 127,966.05 |
| 93 | $ 118,000 | $ 3,788,764 | 0.17430 | 0.1923 | 0.0406 | 131,115.34 |
| 94 | $ 133,000 | $ 4,067,852 | 0.19310 | 0.1552 | 0.0371 | 130,423.15 |
| 95 | $ 150,000 | $ 4,378,745 | 0.21150 | 0.1224 | 0.0328 | 125,356.31 |
| 96 | $ 131,000 | $ 4,685,232 | 0.22770 | 0.0945 | 0.0279 | 118,154.60 |
| 97 | $ 134,000 | $ 5,000,000 | 0.24550 | 0.0713 | 0.0232 | 106,440.21 |
| 98 | $ 131,000 | $ 5,000,000 | 0.26300 | 0.0525 | 0.0188 | 86,872.49 |
| 99 | $ 126,000 | $ 5,000,000 | 0.28370 | 0.0376 | 0.0149 | 69,794.23 |
| 100 | $ 120,000 | $ 5,000,000 | 0.30700 | 0.0261 | 0.0116 | 54,645.53 |

SAMPLE CASHFLOWS AND MORTALITY DATA FOR 58 YEAR OLD PREFERRED RISK (59 EOY)

FIG. 5

| EOY AGE | COL 1 PREMIUM | COL 2 DEATH BENEFIT | COL 3 FORCE OF MORTALITY | COL 4 Pr(SURVIVE TO T) | COL 5 Pr(DIE IN T) | COL 6 EXPECTED CF(T) |
|---|---|---|---|---|---|---|
| 60 | $ 9,000 | $ 1,020,475 | 0.00200 | 0.998 | 0.0020 | (6,941.05) |
| 61 | $ 8,000 | $ 1,029,899 | 0.00260 | 0.9954 | 0.0026 | (5,290.86) |
| 62 | $ 10,000 | $ 1,041,894 | 0.00320 | 0.9922 | 0.0032 | (6,603.46) |
| 63 | $ 12,000 | $ 1,056,588 | 0.00380 | 0.9884 | 0.0038 | (7,877.60) |
| 64 | $ 14,000 | $ 1,074,118 | 0.00440 | 0.9841 | 0.0043 | (9,105.87) |
| 65 | $ 15,000 | $ 1,093,574 | 0.00520 | 0.9790 | 0.0051 | (9,088.58) |
| 66 | $ 16,000 | $ 1,115,052 | 0.00600 | 0.9731 | 0.0059 | (9,020.04) |
| 67 | $ 19,000 | $ 1,140,755 | 0.00690 | 0.9664 | 0.0067 | (10,701.95) |
| 68 | $ 20,000 | $ 1,168,793 | 0.00800 | 0.9587 | 0.0077 | (10,137.15) |
| 69 | $ 23,000 | $ 1,201,382 | 0.00920 | 0.9498 | 0.0088 | (11,250.57) |
| 70 | $ 26,000 | $ 1,238,751 | 0.01060 | 0.9398 | 0.0101 | (11,961.98) |
| 71 | $ 29,000 | $ 1,281,139 | 0.01210 | 0.9284 | 0.0114 | (12,355.53) |
| 72 | $ 32,000 | $ 1,328,796 | 0.01380 | 0.9156 | 0.0128 | (12,274.44) |
| 73 | $ 35,000 | $ 1,381,986 | 0.01570 | 0.9012 | 0.0144 | (11,676.84) |
| 74 | $ 40,000 | $ 1,443,085 | 0.01790 | 0.8851 | 0.0161 | (12,123.88) |
| 75 | $ 45,000 | $ 1,512,489 | 0.02040 | 0.8670 | 0.0181 | (11,707.22) |
| 76 | $ 51,000 | $ 1,591,664 | 0.02330 | 0.8468 | 0.0202 | (11,033.76) |
| 77 | $ 58,000 | $ 1,682,147 | 0.02660 | 0.8243 | 0.0225 | (9,918.13) |
| 78 | $ 23,000 | $ 1,740,404 | 0.03030 | 0.7993 | 0.0250 | 25,084.47 |
| 79 | $ 26,000 | $ 1,804,725 | 0.03450 | 0.7717 | 0.0276 | 29,702.95 |
| 80 | $ 28,000 | $ 1,874,361 | 0.03920 | 0.7415 | 0.0303 | 35,942.33 |
| 81 | $ 32,000 | $ 1,951,679 | 0.04450 | 0.7085 | 0.0330 | 41,726.77 |
| 82 | $ 36,000 | $ 2,037,063 | 0.05070 | 0.6726 | 0.0359 | 48,960.39 |
| 83 | $ 39,000 | $ 2,129,866 | 0.05770 | 0.6338 | 0.0388 | 57,938.37 |
| 84 | $ 43,000 | $ 2,231,509 | 0.06550 | 0.5923 | 0.0415 | 67,167.31 |
| 85 | $ 48,000 | $ 2,343,485 | 0.07240 | 0.5494 | 0.0429 | 74,117.40 |
| 86 | $ 54,000 | $ 2,467,359 | 0.08070 | 0.5050 | 0.0443 | 82,117.80 |
| 87 | $ 59,000 | $ 2,602,677 | 0.09000 | 0.4596 | 0.0455 | 91,186.30 |
| 88 | $ 68,000 | $ 2,754,211 | 0.10030 | 0.4135 | 0.0461 | 98,843.15 |
| 89 | $ 76,000 | $ 2,921,721 | 0.11210 | 0.3671 | 0.0464 | 107,526.81 |
| 90 | $ 85,000 | $ 3,107,057 | 0.12530 | 0.3211 | 0.0460 | 115,636.53 |
| 91 | $ 94,000 | $ 3,311,110 | 0.13930 | 0.2764 | 0.0447 | 122,139.15 |
| 92 | $ 106,000 | $ 3,537,966 | 0.15630 | 0.2332 | 0.0432 | 128,127.49 |
| 93 | $ 118,000 | $ 3,788,764 | 0.17430 | 0.1926 | 0.0406 | 131,280.76 |
| 94 | $ 133,000 | $ 4,067,852 | 0.19310 | 0.1554 | 0.0372 | 130,587.69 |
| 95 | $ 150,000 | $ 4,378,745 | 0.21150 | 0.1225 | 0.0329 | 125,514.46 |
| 96 | $ 131,000 | $ 4,685,232 | 0.22770 | 0.0946 | 0.0279 | 118,303.67 |
| 97 | $ 134,000 | $ 5,000,000 | 0.24550 | 0.0714 | 0.0232 | 106,574.49 |
| 98 | $ 131,000 | $ 5,000,000 | 0.26300 | 0.0526 | 0.0188 | 86,982.08 |
| 99 | $ 126,000 | $ 5,000,000 | 0.28370 | 0.0377 | 0.0149 | 69,882.28 |
| 100 | $ 120,000 | $ 5,000,000 | 0.30700 | 0.0261 | 0.0116 | 54,714.47 |

FIG. 6

ASSUMES:

- 4200 LIVES
- $320 MILLION IN TOTAL DEFERRALS
- CASHFLOW DURATION = 35 YEARS
- ASSUMED RETURN ON COLI SEPARATE ACCOUNT INVESTMENTS = 8%
- COMPANY TARGET ROE = 20%, AFTER TAX
- ASSUMED TAX RATE = 35%
- ASSUMED INDEBTEDNESS > $320 MILLION
- ASSUMED INTEREST RATE ON DEBT = 6%

FIG. 7

| AGE | PARTICIPANTS | COMPENSATION | DB ONLY HEDGE | ANNUAL DEFERRAL |
|---|---|---|---|---|
| 20-30 | 346 | $ 14,677,481 | $ 220,162,222 | $ 1,467,748 |
| 31-35 | 500 | $ 24,711,086 | $ 370,666,291 | $ 2,471,109 |
| 36-40 | 679 | $ 38,247,507 | $ 573,712,600 | $ 3,824,751 |
| 41-45 | 782 | $ 70,242,727 | $ 1,053,640,905 | $ 7,024,273 |
| 46-50 | 724 | $ 69,225,963 | $ 1,038,389,451 | $ 6,922,596 |
| 51-55 | 554 | $ 55,971,133 | $ 839,567,001 | $ 5,597,113 |
| 56-60 | 416 | $ 29,303,672 | $ 439,555,085 | $ 2,930,367 |
| 61-65 | 199 | $ 17,322,980 | $ 259,844,701 | $ 1,732,298 |
| TOTALS | 4,200 | $ 319,702,550 | $ 4,795,538,255 | $ 31,970,255 |

FIG. 8A

| YEAR | A COLI PREMIUM COMPOSITE | B COLI DEATH BENEFIT COMPOSITE | C DEFERRED COMPENSATION COMPOSITE | D DEFERRED COMP TAX COST =C*35% | E DEFFERENT COMPENSATION BENEFITS COMPOSITE | F DEFERRED COMPENSATION BENEFITS TAX SERVINGS =E*35% | G COMBINED NET CASH FLOW =A+B+C+D+E+F |
|---|---|---|---|---|---|---|---|
| 2009 | (57,556,088) | 2,889,067 | 31,970,255 | (11,189,589) | | | (33,897,120) |
| 2010 | (32,016,900) | 4,769,229 | 31,944,075 | (11,180,426) | (16,561) | 5,796 | (6,519,247) |
| 2011 | (48,482,943) | 6,551,562 | 31,909,209 | (11,168,223) | (54,192) | 18,967 | (21,263,254) |
| 2012 | (15,149,458) | 8,091,825 | 31,867,984 | (11,153,795) | (112,091) | 39,232 | 13,537,584 |
| 2013 | (19,576,378) | 9,913,335 | 31,819,294 | (11,136,753) | (183,036) | 64,062 | 10,837,493 |
| | | | | | (280,008) | 98,003 | |
| 2014 | (18,632,412) | 11,764,084 | 31,763,664 | (11,117,283) | (397,932) | 139,276 | 13,519,398 |
| 2015 | (20,714,363) | 14,178,698 | 31,700,062 | (11,095,022) | (22,207,382) | 7,772,584 | (365,423) |
| 2016 | (22,562,502) | 16,978,822 | 31,626,250 | (11,069,187) | (570,719) | 199,752 | 14,602,415 |
| 2017 | (28,075,575) | 20,119,356 | 31,541,781 | (11,039,624) | (762,767) | 266,968 | 12,050,140 |
| 2018 | (35,460,666) | 24,068,526 | 31,443,990 | (11,005,396) | (1,020,433) | 357,151 | 8,383,172 |
| 2019-2023 | (274,994,424) | 206,157,237 | | | (84,933,115) | 29,726,590 | (124,043,712) |
| 2024-2033 | (1,272,309,376) | 1,456,406,690 | | | (374,095,825) | 130,933,539 | (59,064,973) |
| 2034-2043 | (2,680,691,490) | 4,822,765,128 | | | (303,122,375) | 106,092,831 | 1,945,044,094 |
| 2044-2053 | (3,197,491,472) | 6,511,170,493 | | | (123,731,658) | 43,306,080 | 3,233,253,443 |
| 2054-2063 | (941,895,068) | 3,201,555,102 | | | 0 | 0 | 2,259,660,034 |
| 2064-2073 | (125,989,064) | 1,028,317,506 | | | 0 | 0 | 902,328,422 |
| 2074-2083 | (15,714,355) | 211,289,649 | | | 0 | 0 | 195,575,294 |
| 2084-2093 | (186,136) | 7,146,288 | | | 0 | 0 | 6,960,153 |
| 2094-2101 | 0 | 23,532 | | | 0 | 0 | 23,532 |
| TOTAL | (8,807,498,670) | 17,564,156,128 | 317,586,565 | (111,155,298) | (911,486,094) | 319,020,833 | 8,370,621,464 |
| NPV @ 7.0% | (1,225,742,385) | 1,666,888,275 | 223,280,615 | (78,148,215) | (203,284,691) | 71,149,642 | 454,143,240 |
| IRR | | | | | | | 14.0% |

FIG. 8B

| YEAR | RESERVE ASSETS HELD IN CAPTIVE | EQUITY CAPITAL REQUIRED | TAX RESERVE DEDUCTION | EXPECTED CLAIM DEDUCTION | NET DEDUCTION | POLICY NPV | RESERVES-POLICY NPV |
|---|---|---|---|---|---|---|---|
| 1 | $ 783,773,911 | $ 7,837,739 | $ 135,757,310 | $ - | $ 135,757,310 | $ 441,145,890 | $ 342,628,021 |
| 2 | $ 844,177,802 | $ 8,441,778 | $ 141,422,138 | $ - | $ 141,422,138 | $ 526,693,123 | $ 317,484,679 |
| 3 | $ 908,374,372 | $ 9,083,744 | $ 147,322,194 | $ - | $ 147,322,194 | $ 590,809,312 | $ 317,565,060 |
| 4 | $ 976,593,902 | $ 9,765,939 | $ 153,469,920 | $ - | $ 153,469,920 | $ 674,097,345 | $ 302,496,557 |
| 5 | $ 1,049,115,941 | $ 10,491,159 | $ 159,895,775 | $ - | $ 159,895,775 | $ 728,341,792 | $ 320,774,149 |
| 10 | $ 1,676,370,743 | $ 16,763,707 | $ 195,976,678 | $ - | $ 195,976,678 | $ 1,064,030,757 | $ 612,339,987 |
| 15 | $ 2,063,473,814 | $ 20,634,738 | $ 84,658,222 | $ - | $ 84,658,222 | $ 1,568,252,939 | $ 495,220,875 |
| 20 | $ 2,558,557,056 | $ 25,585,571 | $ 109,828,241 | $ - | $ 109,828,241 | $ 2,260,335,145 | $ 298,221,911 |
| 25 | $ 3,212,229,572 | $ 32,122,296 | $ 144,280,098 | $ - | $ 144,280,098 | $ 2,998,553,371 | $ 213,676,201 |
| 30 | $ 4,007,021,581 | $ 40,070,216 | $ 175,533,621 | $ - | $ 175,533,621 | $ 3,460,315,083 | $ 546,706,498 |
| 35 | $ 5,046,338,571 | $ 50,463,386 | $ 233,644,094 | $ - | $ 233,644,094 | $ 3,456,375,389 | $ 1,589,963,181 |
| 40 | $ 5,386,558,633 | $ 53,865,586 | $ (144,012,947) | $ 368,214,380 | $ 224,201,434 | $ 2,897,956,809 | $ 2,488,601,824 |
| 50 | $ 2,230,631,871 | $ 22,306,319 | $ (401,348,498) | $ 512,845,188 | $ 111,496,690 | $ 2,182,075,470 | $ 48,556,401 |

FIG. 8C

| YEAR | G COMBINED NET CASH FLOW =A+B+C+D+E+F | AA REINSURANCE COMPOSITE | BB REINSURANCE CLAIMS COMPOSITE | CC REINSURANCE EX CASH FLOW COMPOSITE | DD CHANGE IN TAX RESERVES COMPOSITE | EE REINSURANCE STAT/ TAX NET INCOME CC-DD | FF REINSURANCE NET INCOME CC-EE*35% -EQUITY-FEES | GG CONSOLIDATED RETURN FF+G |
|---|---|---|---|---|---|---|---|---|
| 2009 | (33,897,120) | | | | | | (7,837,739) | (7,837,739) |
| 2010 | (6,519,247) | 14,370,256 | 0 | 14,370,256 | 135,757,310 | (121,387,054) | 52,770,354 | 18,873,235 |
| 2011 | (21,263,254) | 14,362,784 | 0 | 14,362,784 | 141,422,138 | (127,059,354) | 54,514,433 | 47,995,186 |
| 2012 | 13,537,584 | 14,353,017 | 0 | 14,353,017 | 147,322,194 | (132,969,176) | 56,324,871 | 35,061,616 |
| 2013 | 10,837,493 | 14,340,960 | 0 | 14,340,960 | 153,469,920 | (139,128,960) | 58,204,783 | 71,742,368 |
|  |  | 14,326,906 |  | 14,326,906 | 159,895,775 | (145,568,869) | 60,220,229 | 71,057,722 |
| 2014 | 13,519,398 | 14,310,860 | 0 | 14,310,860 | 166,565,890 | (152,255,030) | 62,327,234 | 75,846,632 |
| 2015 | (365,423) | 14,292,542 | 0 | 14,292,542 | 173,460,128 | (159,167,586) | 64,257,144 | 63,891,721 |
| 2016 | 14,602,415 | 14,271,675 | 0 | 14,271,675 | 180,652,900 | (166,381,224) | 65,484,069 | 80,086,484 |
| 2017 | 12,050,140 | 14,247,556 | 0 | 14,247,556 | 188,135,041 | (173,887,485) | 67,387,149 | 79,437,289 |
| 2018 | 8,383,172 | 14,219,773 | 0 | 14,219,773 | 195,976,678 | (181,756,905) | 70,758,137 | 79,141,308 |
| 2019-2023 | (124,043,712) | | 0 | 0 | 385,158,409 | (385,158,409) | 99,850,232 | (24,193,480) |
| 2024-2033 | (59,064,973) | | 0 | 0 | 1,147,169,569 | (1,147,169,569) | 303,551,160 | 244,486,188 |
| 2034-2043 | 1,945,044,094 | | 0 | 0 | 1,841,717,181 | (1,841,717,181) | 490,647,350 | 2,435,691,444 |
| 2044-2053 | 3,233,253,443 | | (3,271,518,689) | (3,271,519,689) | (876,494,470) | 2,395,024,220 | (2,584,107,530) | 649,145,913 |
| 2054-2063 | 2,259,660,034 | | (4,512,119,808) | (4,512,119,808) | (3,468,735,565) | (1,043,384,242) | (4,182,696,037) | (1,923,036,003) |
| 2064-2073 | 902,328,442 | | (742,742,742) | (742,742,742) | (666,260,104) | (76,482,638) | (715,184,584) | 187,143,858 |
| 2074-2083 | 195,575,294 | | (5,493,955) | (5,493,955) | (5,212,732) | (281,224) | (5,395,527) | 190,179,767 |
| 2084-2093 | 6,960,153 | | (271) | (271) | (263) | (7) | (268) | 6,959,884 |
| 2094-2101 | 23,532 | | 0 | 0 | (0) | 0 | 0 | 23,532 |
| TOTAL | 8,370,621,464 | 143,096,331 | (8,531,875,465) | (8,388,779,134) | 1,637,223,633 | (8,388,779,134) | (5,988,924,539) | 2,381,696,925 |
| NPV @ 7.0% | 454,143,240 | 100,568,222 | (366,220,163) | (265,651,941) |  | (1,902,875,574) | 285,050,878 | 739,194,118 |
| IRR | 14.0% |  |  |  |  |  |  | 325.2% |

FIG. 8D

| YEAR | H PRESENT VALUE OF EXPECTED FUTURE COLI CASH FLOW | I COLI PREMIUM EXPENSE | J COLI DEATH BENEFIT INCOME | K COLI ASSET VALUE INCREASE | L DEFERRED COMPENSATION TOTAL LIABILITY | M (INCREASE)/ DECREASE IN LIABILITY | N DEFERRED TAX CREDIT @ 35% | O COMPENSATION EXPENSE | P COMPENSATION TAX IMPACT | Q COMBINED NET P&L IMPACT OF DEFERRED COMPENSATION FUNDED WITH CASHLESS COLI | R GAAP 159 REINSURANCE P&L | S GAAP CONSOLIDATED INCLUDING CAPTIVE |
|---|---|---|---|---|---|---|---|---|---|---|---|---|
| | NPV(A+B) | =A | =B | =H-H' | COMPOSITE | =-L+L' | =-M*35% | =C+E | =-O*35% | =I+J+K+ M+N+O +P-EQUITY | | |
| | | | | | | | | | | (7,837,739) | | (7,837,739) |
| 2009 | 441,145,890 | (57,556,088) | 2,889,067 | 441,145,890 | 31,970,255 | (31,970,255) | 11,189,589 | 31,953,694 | (11,183,793) | 385,864,065 | (226,647,804) | 159,216,261 |
| 2010 | 526,693,123 | (32,016,900) | 4,769,229 | 85,547,233 | 66,124,236 | (34,153,981) | 11,953,893 | 31,889,883 | (11,161,459) | 56,185,933 | 22,197,979 | 78,383,912 |
| 2011 | 590,809,312 | (48,482,943) | 6,551,562 | 64,116,190 | 102,584,916 | (36,460,681) | 12,761,238 | 31,797,118 | (11,128,991) | 18,471,298 | 21,750,801 | 40,222,098 |
| 2012 | 674,097,345 | (15,149,458) | 8,091,825 | 83,288,033 | 141,492,034 | (38,907,118) | 13,617,491 | 31,684,949 | (11,089,732) | 70,810,770 | 21,217,173 | 92,027,943 |
| 2013 | 728,341,792 | (19,576,378) | 9,913,335 | 54,244,447 | 182,984,453 | (41,492,419) | 14,522,347 | 31,539,286 | (11,038,750) | 37,396,961 | 20,595,616 | 57,992,577 |
| 2014 | 788,988,761 | (18,632,412) | 11,764,084 | 60,646,969 | 227,214,727 | (44,230,273) | 15,480,596 | 31,365,732 | (10,978,006) | 44,715,980 | 19,879,721 | 64,595,700 |
| 2015 | 851,086,302 | (20,714,363) | 14,178,698 | 62,097,541 | 248,103,736 | (20,889,009) | 7,311,153 | 9,492,680 | (3,322,438) | 47,208,926 | 19,051,076 | 66,260,002 |
| 2016 | 917,198,008 | (22,562,502) | 16,978,822 | 66,111,706 | 293,569,464 | (45,465,728) | 15,913,005 | 31,055,531 | (10,869,436) | 49,244,958 | 18,038,092 | 67,283,049 |
| 2017 | 986,985,549 | (28,075,575) | 20,119,356 | 69,787,541 | 341,970,119 | (48,400,654) | 16,940,229 | 30,779,014 | (10,772,655) | 48,382,099 | 16,587,178 | 64,969,276 |
| 2018 | 1,064,030,757 | (35,460,666) | 24,068,526 | 77,045,208 | 393,437,472 | (51,467,354) | 18,013,574 | 30,423,557 | (10,648,245) | 51,270,536 | 14,997,507 | 66,268,043 |
| 2019-2023 | 6,753,998,703 | (274,994,424) | 206,157,237 | 504,222,183 | 1,916,316,906 | (40,792,032) | 14,277,211 | (84,933,115) | 29,726,590 | 349,604,896 | (166,191,114) | 183,413,783 |
| 2024-2033 | 23,360,012,726 | (1,272,309,376) | 1,456,406,690 | 1,430,300,432 | 3,638,238,214 | 135,086,121 | (47,279,792) | (374,095,825) | 130,933,539 | 1,446,998,123 | (597,698,030) | 849,300,093 |
| 2034-2043 | 34,072,326,614 | (2,680,691,490) | 4,822,765,128 | 457,822,018 | 1,703,042,576 | 191,017,186 | (66,856,015) | (303,122,375) | 106,092,831 | 2,507,646,174 | (1,286,554,853) | 1,221,091,321 |
| 2044-2053 | 28,093,524,532 | (3,197,491,472) | 6,511,170,493 | (1,274,299,919) | 236,566,569 | 108,127,197 | (37,844,519) | (123,731,658) | 43,306,080 | 2,044,151,844 | (2,270,256,945) | (226,105,101) |
| 2054-2063 | 13,904,123,931 | (941,895,068) | 3,201,555,102 | (1,339,410,121) | 0 | 0 | 0 | 0 | 0 | 953,491,904 | (1,450,868,188) | (497,376,284) |
| 2064-2073 | 4,384,149,965 | (125,989,064) | 1,028,317,506 | (650,060,785) | 0 | 0 | 0 | 0 | 0 | 257,070,323 | (163,785,783) | 93,284,540 |
| 2074-2083 | 640,860,256 | (15,714,355) | 211,289,649 | (183,100,310) | 0 | 0 | 0 | 0 | 0 | 12,474,984 | (1,236,780) | 11,238,203 |
| 2084-2093 | 14,616,116 | (186,136) | 7,146,288 | (9,476,900) | 0 | 0 | 0 | 0 | 0 | (2,516,747) | (166) | (2,516,913) |
| 2094-2101 | 42,722 | 0 | 23,532 | (37,354) | | | | | | (13,822) | 0 | (13,822) |
| TOTAL | | (8,807,498,670) | 17,364,156,128 | 1 | | | 0 | (593,901,529) | 207,865,535 | 8,370,621,464 | (5,998,924,521) | 2,381,696,943 |
| NPV @ 7.0% | | | | | | | | | | 1,632,681,133 | | 964,620,107 |

FIG. 8E

CORPORATE OWNED LIFE INSURANCE PRODUCT WITH DEATH BENEFITS

CROSS-REFERENCE TO RELATED APPLICATION

This application claims priority to U.S. Provisional Patent Application No. 61/196,151, filed Oct. 15, 2008, which is incorporated herein by reference.

BACKGROUND OF THE INVENTION

1. Field of the Invention

The subject disclosure relates to methods and systems for providing corporate owned life insurance products via a computing network, and more particularly to improved methods and systems for optimizing the return on the corporate owned life insurance products.

2. Background of the Related Art

In the United States, generally accepted accounting principles (GAAP) are commonly followed by corporations in managing accounting related activity. Various organizations promulgate additional guidelines to help define terms so that corporate financial statements and ledgers may be effectively evaluated and analyzed. One such organization is the Financial Accounting Standards Board (FASB).

Over recent years, GAAP have moved toward "fair value" accounting and international standards that more properly recognize the true fair market value of financial instruments. Fair value measurements are instrumental in determining the value of corporate owned life insurance (COLI) products. In the past, there have been many different approaches to structuring COLT products. COLI is life insurance on employees' lives that is owned by the employer corporation. One type of COLI product is a cash value program (COLI-CV). A COLI-CV product requires a high initial investment and premium with the primary objective of increasing policy value while deferring taxes on the accumulated growth. Currently, Congress limits and provides guidelines for COLI practice as well.

The current accounting for life insurance applied by most business entities is FTB 85-4. Issued in 1985, FTB 85-4 states that the asset value to be carried for life insurance is the cash surrender value of the policy. FTB 85-4 presupposes that the only market available to a policy owner is the insurance carrier from whom the policy was acquired. Since the issuance of FTB 85-4, financial markets and accounting have progressed. Markets have evolved that will purchase all or a portion of an insurance contract for an amount greater than the amount of cash surrender value and accounting rules such as the recent FTB 85-4-1 reflect these developments.

The "fair value" standard often results in a value for an asset that is different from the market value. The application of FASB 159 to COLI results in an asset value that more properly reflects the fair value of the asset by taking into account all aspects of the nature of the contract to include premium, cash value and the future receipt of policy proceeds. This is consistent with how closely analogous assets in the capital markets are valued. A typical UL contract, for example, is essentially a zero coupon swap which matures when the insured dies.

FAS 159 provides for the initial recognition of COLI policies at adoption and subsequent recognition of changes in value of a COLI policy based on a measure of fair market value. Unless the purchaser elects that the policy(s) will be accounted under FAS 159, then FTB 85-4 will apply.

The subject technology highlights the differences between traditional accounting and fair value under FASB 157 and 159 as can be seen in FIG. 2A. Traditionally, COLI does not lend itself to the fair value option. However, FASB 159 provides for the initial recognition of the COLI policies at adoption and subsequent recognition of changes in value of a COLI policy based on a measure of fair market value.

FASB has set out a number of statements including statements number 157 and 159. Statements 157 and 159 relate to fair value measurements and attempt to clarify and simplify traditionally complex accounting practice related to the same. These statements are particularly aimed at clarifying fair value measurements of investments, which ultimately determine tax consequences and similar financial outcomes on corporate ledgers.

FASB 157 defines fair value as the price that would be received to sell an asset or paid to transfer a liability in an orderly transaction between market participants at the measurement date. Embedded in this definition are certain presumptions that need to be understood when calculating fair value. The presumptions are: the price is based on an orderly transaction between market participants at the measurement date from the point of view of the transferor; fair value is asset or liability specific; there is an orderly transaction in which the sale has occurred after a reasonable period of marketing activities has occurred; the transfer takes place in the principal or most advantageous market for the asset or liability; the buyers and sellers in the principal market are called market participants; and fair value for assets is based on their highest and best use, and fair value for liabilities assume the risk of nonperformance will be the same before and after the transfer.

In the context of the presumptions above, FASB 157 allows three valuation techniques that can be used individually or in combination. The market approach uses market prices and other information from market transactions involving identical or comparable assets or liabilities. The income approach is based on the present value of a future stream of cash flows or income. Lastly, the cost approach is essentially replacement cost based on the cost for a buyer to acquire or construct assets of comparable utility.

The use of any one of these approaches requires the use of "inputs" which are assumptions used in the calculation of fair value. These inputs could include risk factors, interest rates and timing of cash flows to name a few. The inputs are categorized into "level 1", "level 2" or "level 3" inputs depending on the reliability and verifiability of the input. Valuations using "level 1" inputs are better than "level 2" inputs, which are better than "level 3" inputs. FASB 157 also expands the disclosure requirements to include information on the "inputs" used in the three valuation techniques discussed above. The disclosure requirements distinguish between fair values measured on a recurring basis and those measured on a non-recurring basis.

FASB 159 expand the use of fair value measurements for financial instruments that are not otherwise required to be stated at fair value. FASB 159 does not change any previous standards that require the use of fair value. The use of fair value is optional and applies to not-for-profits as well as for-profit entities. An entity's decision to apply fair value under this statement is made at certain defined election dates on an item-by-item basis. Therefore, an entity could have several identical assets and liabilities of which some are measured at fair value and the remaining at some other value. However, once the choice is made to apply fair value under FASB 159, it is irrevocable. Lastly, the gains and losses from changes in fair value resulting from applying FASB 159 are recognized in income.

Under FASB 159, eligible items for fair value treatment include all recognized financial assets or liabilities except investments in consolidated subsidiaries, interests in consolidated variable interest entities, assets or obligations relating to employee benefits, financial assets or liabilities relating to leases, demand deposit liabilities and financial instruments where all or a part are classified as a component of equity by the issuer. The election to treat the assets or liabilities can occur on certain dates which include the date on which an eligible item is first recognized, the date the entity first enters a firm commitment, the date financial assets which had always been measured at fair value no longer qualify for that treatment, the date the percentage ownership changes in an investment and the date on which an event requires an asset or liability to be measured at fair value once but not at each balance sheet date.

FASB 159 also allows securities under FASB 115 that are classified as available-for-sale and held-to-maturity to be included in the fair value election. Under FASB 115, the unrealized gains and losses on available-for-sale are currently included in other comprehensive income. If an entity elects to treat available-for-sale securities under FASB 159, then the unrealized gains and losses would be included in income and the securities would be subsequently classified as trading.

While the disclosure requirements of FASB 159 are quite extensive, the disclosure requirements do not replace the disclosure requirements of other pronouncements. The disclosure requirements are intended to facilitate comparisons between entities, as well as between assets and liabilities of a single entity that are measured differently. The disclosure requirements also serve to explain why management elected or partially elected fair value measurements and how the election impacts earnings.

SUMMARY OF THE INVENTION

In view of the above, a need exists for COLI products that optimize return for the owner and employee participants. Preferably, the COLT product would utilize FASB 157 and 159.

In one embodiment, the COLI product or program is for employees and non-employees of the entity. The COLI program is designed to be a COLI-DB ("death benefits") program rather than a COLI-CV ("cash value") program.

A COLI-DB program is designed to provide the most cost efficient death benefits to the policy owner. The COLI-DB program requires very little upfront investment and incorporates competitively priced premiums to achieve the primary objective of maximizing the death benefits with the most cost efficient coverage available. Using this strategy without regard to the tax deferral objective, the COLI-DB program has a negligible cash surrender value.

It is envisioned that FTB 85-4, which requires COLI policies to be accounted for using the cash surrender value, is not a fair measure of the true economic value of the asset. FTB 85-4-1, which allows for investors to record purchased policies at cost is an acknowledgment that cash surrender, at a minimum, is not the preferred GAAP measure for policy investors or purchasers. As a result, different accounting is created for the same asset depending on the holder. The cash surrender value or FTB 85-4 measure of a portfolio of COLI-DB policies has very little value, yet an independent appraisal of that same portfolio by an actuary (or perhaps a FTB 85-4-1 purchaser) will yield a higher and better estimate of the fair value of the policy.

A COLI program in accordance with the subject technology may also be designed to protect itself against key-man mortality risk. Although this is a primary objective, the company has no intention of allowing its investment in the policy to lapse if the employees terminate their employment or no longer have key-man impact. As such, the Company's dual purpose for these policies is to provide business protection and to recover its investment in the policy by sustaining the policies beyond the business protection objective. This approach positions the company as an investor in these policies similar to FTB 85-4-1 investors.

The present disclosure is also directed to creating policy forms and structures that best respond to accounting standards. As such, applying fair value under FASB 159 and 157 is harmonious with the structure of the COLI products. A company may apply an FASB 159 method of accounting and mark death benefits to market under FASB 157, creating assets on balance sheet and income in income statements that would not previously have been recognized. The COLI program may also include the company reinsuring death benefits through a company-owned captive to hedge mortality.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

FIG. 2A is a table comparing traditional cash value centric products.

FIG. 2B is a table of the results for a corporate owned life insurance product with minimal cash value in contrast to FIG. 2A.

FIG. 3 a table of sensitivities to the premium of a put option, using the Black & Scholes Model.

FIG. 4 is a table showing the balance sheet of a sample life insurance company illustrating a detailed determination of the company's credit default swap (CDS) premium estimation.

FIG. 5 is a table of sample cashflows and mortality data for a 58 year old preferred risk individual.

FIG. 6 is a table of sample cashflows and mortality data of the same individual as in FIG. 5, one year aged from underwriting.

FIG. 7 is a table showing the return of a COLI-CV for the owner and the employee participants.

FIG. 8A is a table showing assumptions taken for sample company illustrating the use of accounting in subsequent drawings.

FIG. 8B is a table showing the consolidated return on equity for a sample company using COLI with Death Benefits (COLI-DB).

FIG. 8C is a table showing reserve requirements in the Captive.

FIG. 8D is a table showing the return on equity for a sample company using COLI-DB after reinsurance through a captive.

FIG. 8E is a table of GAAP Income statements and balance sheets related to a COLI.

DETAILED DESCRIPTION OF PREFERRED EMBODIMENTS

Figure 1:
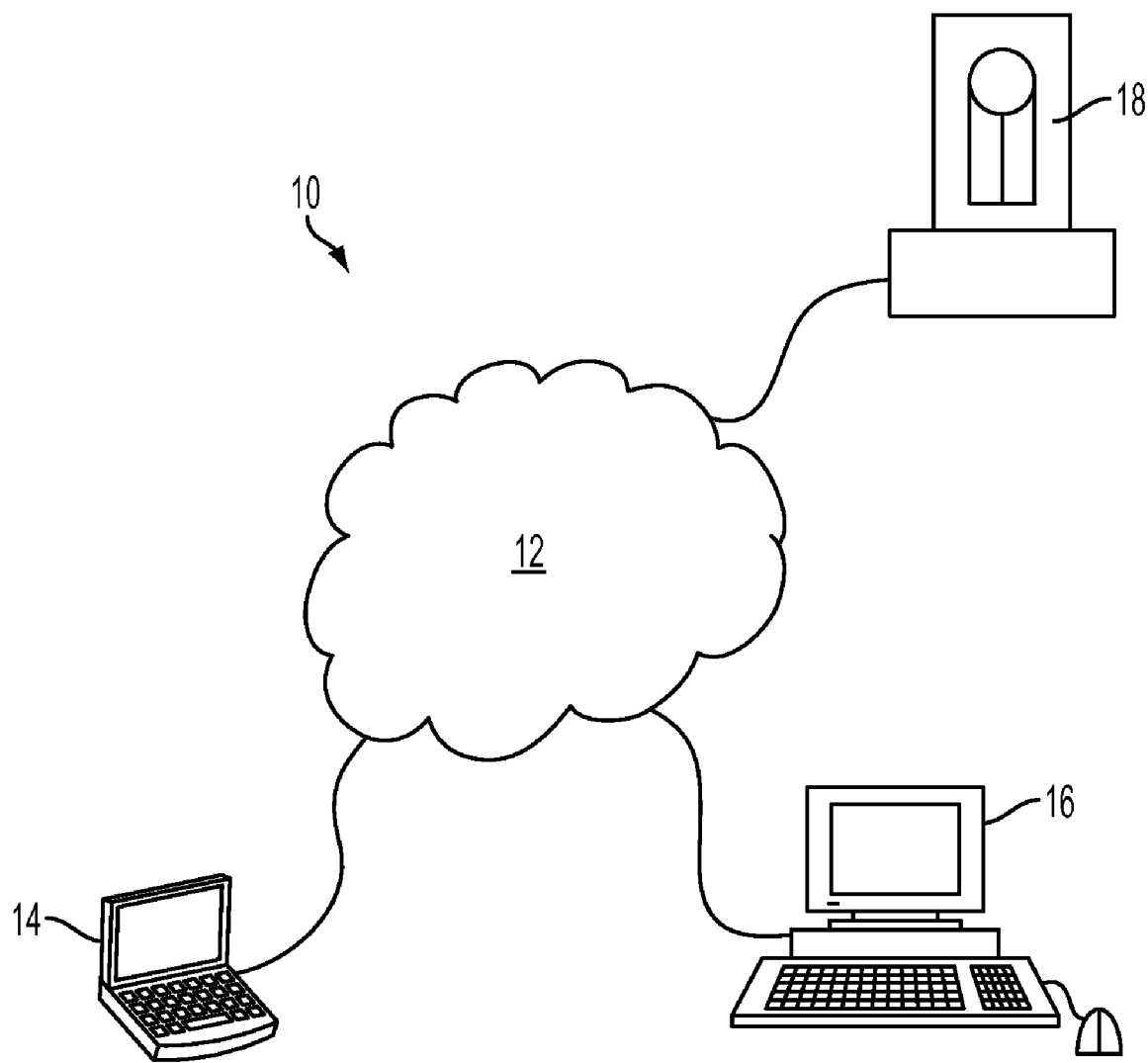
FIG. 1 is a diagram showing an environment in which corporate owned life insurance products may be created and utilized in accordance with the subject disclosure.

The subject technology optimizes the return associated with corporate owned life insurance products. The advantages, and other features of the systems and methods disclosed herein, will become more readily apparent to those having ordinary skill in the art from the following detailed description of certain preferred embodiments taken in conjunction with the drawings which set forth representative embodiments of the present invention.

DEFINITIONS

A computer means one or more digital data processing devices used in connection with various embodiments of the invention. Such a device generally can be a personal computer, computer workstation (e.g., Sun, HP), laptop computer, server computer, mainframe computer, handheld device (e.g., personal digital assistant, Pocket PC, cellular telephone, etc.), information appliance, printed circuit board with components or any other type of generic or special-purpose, processor-controlled device capable of receiving, processing, displaying, and/or transmitting digital data. A typical computer includes random access memory (RAM), mechanisms and structures for performing I/O operations, a storage medium such as a magnetic hard disk drive(s), and an operating system (e.g., software) for execution on the central processing unit. The computer also has input and output devices such as a keyboard and monitor, respectively.

A processor generally is logic circuitry that responds to and processes instructions that drive a computer and can include, without limitation, a central processing unit, an arithmetic logic unit, an application specific integrated circuit, a task engine, and/or any combinations, arrangements, or multiples thereof.

Software or code generally refers to computer instructions which, when executed on one or more digital data processing devices, cause interactions with operating parameters, sequence data/parameters, database entries, network connection parameters/data, variables, constants, software libraries, and/or any other elements needed for the proper execution of the instructions, within an execution environment in memory of the digital data processing device(s).

A module is a functional aspect, which may include software and/or hardware. Typically, a module encompasses the necessary components to accomplish a task. It is envisioned that the same hardware could implement a plurality of modules and portions of such hardware being available as needed to accomplish the task. Those of ordinary skill will recognize that the software and various processes discussed herein are merely exemplary of the functionality performed by the disclosed technology and thus such processes and/or their equivalents may be implemented in commercial embodiments in various combinations without materially affecting the operation of the disclosed technology.

A network can be a series of network nodes (each node being a digital data processing device, for example) that can be interconnected by network devices and communication lines (e.g., public carrier lines, private lines, satellite lines, etc.) that enable the network nodes to communicate. The transfer of data (e.g., messages) between network nodes can be facilitated by network devices such as routers, switches, multiplexers, bridges, gateways, etc. that can manipulate and/or route data from an originating node to a destination node regardless of any dissimilarities in the network topology (e.g., bus, star, token ring, etc.), spatial distance (local, metropolitan, wide area network, etc.), transmission technology (e.g., TCP/IP, Systems Network Architecture, etc.), data type (e.g., data, voice, video, multimedia, etc.), nature of connection (e.g., switched, non-switched, dial-up, dedicated, virtual, etc.), and/or physical link (e.g., optical fiber, coaxial cable, twisted pair, wireless, etc.) between the originating and destination network nodes.

Referring now to the FIG. 1, there is shown a block diagram of an environment 10 with a system embodying and implementing the methodology of the present disclosure. The system connects users (e.g., companies, employees, life insurance providers and the like). The system is user-interactive and may be self-contained so that users need not leave venture to another address within a distributed computing network to access various information. The following discussion describes the structure of such an environment 10 but further discussion of the applications programs and data that embody the methodology of the present invention is described elsewhere herein.

The environment 10 includes one or more servers 18 which communicate with a distributed computer network 12 via communication channels, whether wired or wireless, as is well known to those of ordinary skill in the pertinent art. In a preferred embodiment, the distributed computer network 12 is the Internet. For simplicity, one server 18 is shown. The server 18 hosts multiple Web sites and houses multiple databases necessary for the proper operation of the system in accordance with the subject invention.

The server 18 is any of a number of servers known to those skilled in the art that are intended to be operably connected to a network so as to operably link to a plurality of clients 14, 16 via the distributed computer network 12. The plurality of computers or clients 14, 16 are desktop computers, laptop computers, personal digital assistants, cellular telephones and the like. The clients 14, 16 allow users to access information on the server 18. For simplicity, only two clients 14, 16 are shown. The clients 14, 16 have storage and computing capabilities along with displays and input devices as would be appreciated by those of ordinary skill in the pertinent art.

The clients 14, 16 typically include a processor including one or more micro-processors, random access memory (RAM), mechanisms and structures for performing I/O operations, a storage medium such as a magnetic hard disk drive(s), a device for reading from and/or writing to removable computer readable media and an operating system for execution on the central processing unit. According to one embodiment, the hard disk drive of the clients 14, 16 is for purposes of booting and storing the operating system, other applications or systems that are to be executed on the computer, paging and swapping between the hard disk and the RAM and the like. The servers 18 may be similarly configured.

In one embodiment, the application programs reside on the hard disk drive for performing the functions in accordance with the system to utilize COLI products. In another embodiment, the hard disk drive simply has a browser for accessing an application hosted within the distributed computing network 12 such as on the servers 18. The clients 14, 16 can also utilize a removable computer readable medium such as a CD or DVD type of media that is inserted therein for reading and/or writing to the removable computer readable media.

In FASB 159, paragraph A5, the background for including insurance contracts in the scope of FASB 159 is described as follows: "A5. Some respondents questioned whether insurance contracts are financial instruments. Some insurance contracts require the payment of cash to settle a claim (and thus are financial instruments in the scope of this Statement), whereas others may permit settlement of a claim by either a cash payment or the provision of goods or services (by the insurance company or by a third party that is compensated by the insurance company), in which case the insurance contract would not meet the definition of a financial instrument. Some respondents noted that scrutinizing individual contracts to determine whether they are financial instruments would be quite burdensome, as would be the case in determining whether warranty rights and obligations meet the definition of a financial instrument. The Board decided to expand the scope of this Statement slightly by including insurance and reinsurance contracts as well as warranty rights and obligations that permit or require settlement of a claim by providing goods or services if settlement of the related obligation is permitted by payment to a third-party provider of goods or services rather than only by the insurer's or warrantor's providing goods or services directly to the insured or other claimant."

Paragraphs 12(c) and (d) of FASB159 provides further guidance on insurance contract related issues as follows: "(c) If the fair value option is applied to an eligible insurance or reinsurance contract, it shall be applied to all claims and obligations under the contract."; and "(d) If the fair value option is elected for an insurance contract (base contract) for which integrated or nonintegrated contract features or coverages (some of which are called riders) are issued either concurrently or subsequently, the fair value option also must be applied to those features or coverages. The fair value option cannot be elected for only the nonintegrated contract features or coverages, even though those features or coverages are accounted for separately under AICPA Statement of Position 05-1, *Accounting by Insurance Enterprises for Deferred Acquisition Costs in Connection With Modifications or Exchanges of Insurance Contracts.*"

In view of the above, clearly, FASB intended to include insurance policies as eligible financial instruments subject to the FASB 159 Fair Value Option.

Overview of COLI Death Benefits Program

Most Corporate Owned Life Insurance (COLT) that is sold has the following characteristics: the COLT is part of deferred compensation plan for highly paid executives; the COLI is designed with high cash values and tax deferral on accumulation in mind; and the COLI is generally not individually underwritten but is issued on a group simplified or guaranteed issue basis. This traditional type of COLI is focused on tax-deferral of inside buildup of cash values. In the following, this type of COLI, which to date has been the dominant form, is referred to as COLI-CV where the CV denotes "Cash Value" as the important feature. Because COLI-CV has considerably more cash funding and is not individually underwritten, the rate of return on premium charges (or "COI" for cost of insurance) is less than what could otherwise be achieved without the primary tax deferral objective. The accounting COLI-CV has conventionally followed FTB 85-4 and is naturally cash surrender value focused.

Referring to FIG. 7, a table showing the return of a COLI-CV for the owner and the employee participants is illustrated. The formula used for foregone earnings because capital is invested outside the core business is the size of the deferral times the difference between the target return on investment and the return on funded investments for the duration of the program. In the example of FIG. 7, the foregone earnings was equal to $1.34 billion (e.g., [$320 million×(20%-8%)×35]). Further, other accounting modifications may occur such as elimination of general deductions for indebtedness for amounts of dept equal to COLI cash value, which in this example, should be an additional cost of $235 million. As can be seen, this example illustrates the sub-optimal results of the COLI-CV.

Turning to a COLI program implemented by the system in the environment 10 in accordance with the subject technology, a COLI program is designed and implemented to provide cost efficient death benefits to the policy-owner/employer and to employees who may share a portion of the death benefit. This type of COLI program can be called COLI-DB where the DB denotes "Death Benefits" as the important feature.

A COLI-DB program may have the following characteristics: use of competitively priced universal life in the market; use of competitive quotes from multiple carriers; individual underwriting; minimal cash value funding; and adjustment of death benefits upward over time to maintain value of benefits net of inflation (particularly employee benefit inflation rate).

Each individual COLI-DB universal life policy typically has an internal rate of return to life expectancy, as measured by the most recent select mortality tables, of 7-10%. A portfolio of such policies will typically have a portfolio internal rate of return of 10-13% due to the inherent convexity of the underlying policies. These returns are tax-free to the employer. As can be seen, a properly selected and structured COLI-DB portfolio provides an attractive long term benefits funding vehicle for employers. As can be seen, COLI-DB will have readily verifiable returns.

In contrast, COLI-CV, pursuant to application of FTB 85-4, requires the policy holder to mark to cash surrender value. Accordingly, the COLI-CV valuation does not reflect the true economic value of the portfolio, particularly in light of FASB 157 and 159 standards.

Valuation of COLI-DB Using Accepted Actuarial Valuation Principles

Referring to FIGS. 5 and 6, valuation of a universal life policy which is part of a COLI-DB program involves several steps. First, the schedule of contract premiums and death benefits are obtained. Second, actuarial forces of mortality are obtained from an applicable mortality table for the given insured's age. Third, an appropriate discount factor for the cashflows must be chosen which reflects (1) market rates for comparable counterparty risk and (2) a risk premium for illiquidity. Fourth, values should reflect a haircut for low statistical credibility for small portfolios. We discuss each of these below in turn.

1. Cashflow Schedules

Most contracts are guaranteed UL premiums and death benefits with return of premium ("ROP") riders. Premiums are minimally funded to maintain the death benefit in force each year. In some early years, no premium is required at all subsequent to the first year target premiums. Death benefits which include ROP riders increase each year with any premium paid plus interest, where the interest rate varies per the contract from 0 to 8%. Generally, policies with the greatest interest rate reflect the best value to the owner. Hence, where available, the highest interest rates are chosen. For example, the interest rate may be 5%.

2. Mortality Assumptions

For most applications, the conservative choice for mortality data is the 2008 SOA Preferred Mortality Tables with Select Factors or the like. The mortality tables reflect the most recent data for insureds who are "select", i.e., able to qualify for life insurance. The 2008 Valuation Basic Table ("2008 VBT") is another commonly available table the society of actuaries (SOA) website. Such tables, calculated based on a large sample preferred mortality study, are the latest and most conservative mortality assumptions available. Preferred risk insureds have extended expected lifespans by 1 to 3+ years at varying ages as compared to the recently released 2001 VBT which is most often used.

In one embodiment, for all super preferred or preferred best risk classes, the RR70 table is used. For preferred classed, the RR110 table is used. And for standard classes, the 2008 RR150 table is used (RR denotes "Relative Risk"). The preferred and super-preferred tables have forces of mortality which are 50-80% of the 2001 VBT Tobacco distinct tables. Smokers are treated similarly. Rated classes are also valued against the 2008 tables but using a rating class one better than underwritten. For example, if the policy issued at Table B or 150%, the policy is valued at Table A or 125% using the 2008 VBT as specified above.

3. Discount Factor Selection a. Credit Risk

The COLI policies are long duration assets. Choosing the proper discount factor should first begin with choosing a base rate of the proper duration. In one embodiment, the system benchmarks the competition to determine how other carriers in the pool issue 30 year and longer funding. At the time of filing the subject patent application, companies, generally all AA or better credits, issue at approximately 30 year Constant Maturity Swap rate ("CMS") plus [143] basis points, the Counterparty Credit risk premium. This is estimated using the following model.

The system analyzes the capital structure of a regulated Life Insurance Operating Company ("Life OpCo"), impute the riskiness of the assets from traded credit default swap (CDS), where available from the holding company, and price new CDS rates based upon the riskiness of the assets in the regulated company and the level of overcollateralization of policyholder reserves (the most senior credit class) provided by debt, preferred, surplus notes, equity, and the like. CDS is a swap contract in which the buyer is purchasing protection against the default of the credit of the underlying company. CDS is a measure of the credit risk premium in a given industry, when averaging the implied premiums of diverse companies in the same sector. The typical regulated Life OpCo has about 20% overcollateralization. The system determines the CDS prices by pricing long dated puts on the capital structure to compute the expected loss to policyholders and then amortize the present value premium over a shorter period of 12 years.

Referring to FIG. 3, a table of some premium sensitivities is shown, using the Black & Scholes pricing model for different volatilities and capital structures. Under stress scenarios typical in the relevant market, the Counterparty Credit premium ranges from 100 to 200 bps. FIG. 4 illustrates a balance sheet of a sample life insurance company illustrating a detailed determination of the company's credit default swap (CDS) premium estimation.

The system estimates the CDS risk premium for the Life Insurance Company from the Holding Company's traded CDS premium. Prudential Financial Incorporation ("PruFin") is an example of a Holding Company for the Life Insurance Company ("LifeCo") and the following information is hypothetical for illustrative purposes with the assumption that the eventual CDS premium considered for discount calculation is an average depending on the composition of the carriers in the COLI policies portfolio.

PruFin 27Y corporate bond trades at 6.857% yield. Since the interpolated 27Y swap rate is 3.864%, the implied 27Y Prufin premium is 2.99% as of that date. Assuming a recovery rate of 60% in case of a company default, the system can present value the premium cashflows over 27 years, weighted by the implied probability of the company survival (CDS Premium/[1-Recovery Rate]), which is equal to 23.2% in this example.

From PruFin's financial statements (shown in FIG. 4), the system extracts the amount of leverage. The overcollateralization ratio for PruFin is 445,011/431,589=100/97.

Using a Black & Scholes pricing model for American Put Options, the system finds the implied Asset volatility $\sigma_a$, using the following assumptions: 27Y risk-free rate of 3.94% as of Sep. 30, 2009, 0% dividend yield, 27Y term, a current price of 100, a strike of 97 and a put price that is equal to the present value of premiums calculated above, i.e. 23.2%. The result is that $\sigma_a$=28.5%.

The system then inputs $\sigma_a$ back in the B&S model to find out the implied CDS Premium for the LifeCo, by stripping out the liabilities of anything that is not insurance reserves related. The overcollateralization ratio for LifeCo is then 445,011/370,329=100/83.2. By only changing the strike of the option in the B&S model, we find an implied put price of 16.9, which equates to 27Y CDS premium for LifeCo of 1.57%, using the same present value (PV) methodology as above.

By extending the model to a 30Y term, using a 30Y risk-free rate of 4.05%, the system finds a put price of 16.8, which equates to a 30Y CDS Premium of 1.51% for LifeCo. For a pool of policies coming from different carriers, the credit risk premium is [143] bps over the 30 year swap.

b. Systematic Risk

The spread to 30 year CMS should be adjusted to reflect that the policies are senior to the debentures issued into the capital markets. In one embodiment, the system uses a modest deduction of 100 basis points although larger and smaller deductions can also be utilized.

c. Liquidity Risk

The system adds a spread for lack of liquidity. Given an average duration of 30-35 years, discounting/haircutting the assets by 15-20 percent for lack of liquidity would seem more than adequate. Preferably, the system adds a 50 basis point premium for lack of liquidity. When the adjustments for credit risk, systematic risk and liquidity risk (a+b+c) are added together, the result is a discount rate of 30 year CMS plus 293 basis points.

Example for an Individual COLI Policy with Death Benefits

Referring to FIG. 5, a table of sample cashflows and mortality data for a 58 year old preferred risk individual is shown. Column (1) is equal to premiums from policy illustration. Column (2) is equal to death benefit from policy illustration. Column (3) is equal to force of mortality (hazard rates) for 58 year old from 2008 SOA Preferred Mortality Tables with Select Factors. Column (4) is equal to probability of surviving to year T. In first year, S(1), the probability of surviving year 1, is one minus the hazard rate in column (3). S(2)=S(1) multiplied by one minus the hazard rate for year 2 in column (3). S(3), S(4), ..., S(N) are calculated similarly. Column (5) is equal to probability of death in year T. D(1), the probability of dying in year 1, is equal to the hazard rate in year 1 from column 3. D(2) is equal to S(1) multiplied by the hazard rate in year 2 from column 3. D(3), D(4), ..., D(N) are calculated similarly. Column (6) is equal to expected cash flow in year T calculated as the probability of death in year T multiplied by the death benefit in column (2) minus the probability of surviving to year T multiplied by the premium in column (1). The expected net present value (NPV) at [6.865]% (excluding small sample haircut) for the table in FIG. 5 is $[140,974].

For year to year income flows, the calculation of the expected NPV can be repeated by rolling the cashflows forward and using the proper hazard rates for an insured one year older and one year aged from underwriting. In other words, updating the above 58 year old into a 59 year old and pulling the correct hazard rates from the 2008 SOA Preferred Mortality Table for a 59 year old one year aged from underwriting (one year old select) as shown in FIG. 6. The same NPV analysis, one year later, yields an NPV of $159,567. This is a year on year increase of $18,593 which would represent income from the mark to FMV.

The following are journal entries and proposed accounting for this example. The first journal entry records the year 1 Payment of Premium: Dr. (debit record) Premium Expense of $10,000; and Cr. (credit record) Cash of ($10,000). The second journal entry records the year 1 Cumulative Effect of Change in Accounting Principle for adoption of FAS 159: Dr. Investment in COLI portfolio $140,974; and Cr. Cumulative Effect of Change in Accounting Principle ($140,974). The third journal entry records the year 2 Payment of Premium: Dr. Premium Expense $9,000; and Cr. Cash ($9,000). The fourth journal entry records the year 2 fair market value adjustment; Dr. Investment in COLI Portfolio $18,593; and Cr. Income from Appreciation of COLI Portfolio ($18,593). The fifth journal entry assumes the insured person dies at the end of year 2; Dr. Cash $1,020,475; Cr. Investment in COLI Portfolio ($159,567); and Cr. Income from COLI Death Benefits ($860,908).

Overall, the premiums can be expensed each year and act as an offset to the fair market value adjustment. When the death benefit is realized, rather than a windfall gain, only the difference between the carrying value, at fair market value, and the death benefit proceeds are recognized in income. The result is more accurate because the policy accumulates value each year prior to death, and as such, only the difference between carrying or accumulated value and the death benefit is the true gain. The underlying premise is that it is logical to assume that the policy value accumulates as the person ages. It is proper that this accounting treatment be afforded to companies who view their policies as an investment.

Although investing in policies that pay death benefits on key personnel may seem to some distasteful and unpleasant, it should come as no surprise that these policies increase in value as the insured ages. The traditional view of these policies having very little value prior to the insured dying is simply not true, and certainly not the view of the actuarial profession.

4. Haircut for Small Sample Size

Referring to FIG. 2B, a table of results for a small sample size is shown to contrast with the table of FIG. 2A. Based on the number of lives in a given COLI pool, the credibility of assumptions may need to be adjusted. In the example of FIG. 2B, it is assumed that the dollar weighted average age in the pool is about 45 years. The standard deviation per life at this age is approximately 10 years. If there are approximately 100 lives in the portfolio resulting in a portfolio standard error of 1 year, the system would apply a 2 standard error shift to the pricing model to achieve a net present value which should not exceed 97.7% of cases due to idiosyncratic (small sample size) variation.

COLI Program and Reinsuring through Captive

From a corporation's perspective, a COLI program in accordance with the subject technology may further enhance the company's returns. The returns may be further enhanced by using a corporate-owned captive company to reinsure the risk on the mortality risk on the COLI-DB. Referring to FIGS. 8A, 8B and 8D, a numerical example of enhancement of the company's returns is shown in tabular form. In the figures herein, tables include reference letters for columns. Formulas for how a column is calculated are included in the first row of such tables using the column reference letters.

The data of FIGS. 8A, 8B and 8D illustrates: the benefits of COLI-DB over COLI-CV from a company's perspective; applying a FASB 159 method of accounting and marking death benefits to market under FASB 157; and creating assets on balance sheet and income in income statements that would not previously have been recognized.

To further explain the following examples, the following facts apply or are assumed for illustration. The sample life insurance company is a large specialty retail chain with $4 billion in revenues, and 4200 employees in the top 35% of payroll (e.g., $300 mm). The sample life insurance company owns $1.5 billion in real estate and has a market capitalization of 1.25 times sales. Several assumptions apply to the deferred compensation plan as follows: plan credits of 7% fixed rate to participants; participants defer 10% of income for 10 years; account balance paid at 65 or death, which ever is earlier; and company buys cashless COLI policies designed with initial death benefit equal to 15 times total pay.

The company further enhances returns by capitalizing and reserving in a captive under Actuarial Guideline AXXX/AG38 as shown in FIG. 8C. AXXX/AG38 is a regulation for reserve requirements of universal life with premium guarantees. Advantages include reducing after tax cost of funds and mortality costs. In the numerical example, the ROE goes from 14% (as seen in FIG. 8B) to 325% (as seen in FIG. 8D) by capitalizing and reserving in a captive.

With respect to FIG. 8B, several additional condition apply or are assumed. A deferred compensation plan exists, 7% expected plan crediting rate, and funding is with zero cash buildup, high IRR policies which can be accounted for under GAAP rules as fair value financial assets.

With respect to FIG. 8C, the capitalizing and reserving in a captive may use the following approach. The parent company may transfer the balance sheet capacity to the captive in the form of reserves. The captive may build reserves mainly with a loan or letter of credit from the parent company. Equity capital is a small percentage of reserves. The reserve requirement net of policy NPV held by the parent company is modest when compared to overall value creation and can be satisfied using intercompany entries without friction.

Referring again to FIG. 8D, the advantages of using a captive include reducing the after tax cost of funds and mortality costs with a greatly increased ROE over the base case. The captive may also be able to join FHLB as a life insurance company to obtain low cost secured lending. Such cost savings could be 200-300 basis points. In one embodiment, a facilitating company creates and operates the COLI-DB a commission from fronting carrier on policies issues and a percentage of reinsurance commission in the form of ceding commission and expense allowance as well as managing the assets.

Referring now to FIG. 8E, GAAP Income statements and balance sheets related to COLI products in accordance with the subject disclosure are better than traditionally funded approaches.

As can be seen, COLI-DB provides shareholder returns on equity above their target levels with superior risk-adjusted benefits to employee participants. Additional value is added by reducing secured lending costs through the captive life insurance company.

The flow charts herein illustrate the structure or the logic of the present technology, possibly as embodied in computer program software for execution on a computer or network. Those skilled in the art will appreciate that the flow charts illustrate the structures of the computer program code elements, including logic circuits on an integrated circuit, that function according to the present technology. Further, tables, charts and screen shots herein can be rendered in paper or on viewing devices associated with clients 14, 16 and server 18 in the environment as well as by other means as would be appreciated by those of ordinary skill in the art. As such, the present invention may be practiced by a machine component that renders the program code elements in a form that instructs a digital processing apparatus (e.g., computer) to perform a sequence of function steps corresponding to those shown in the flow charts or claims.

Figure 9:
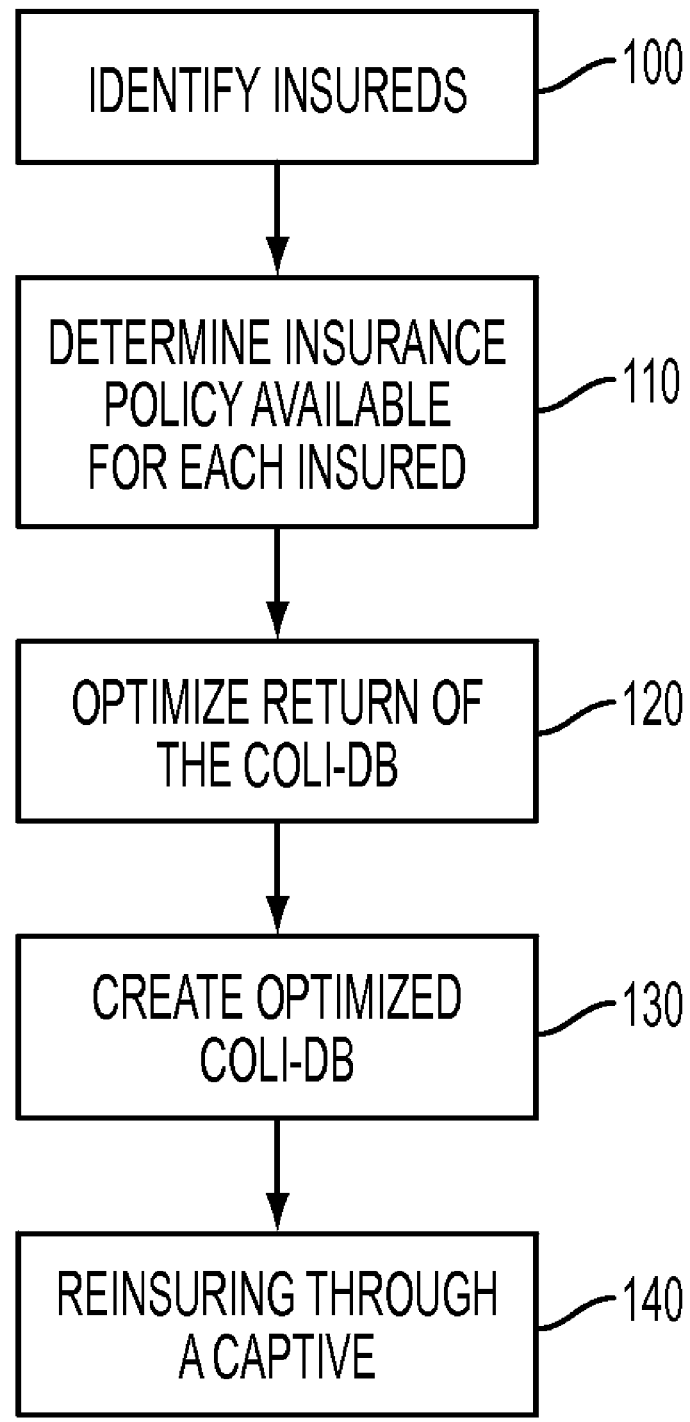
FIG. 9 is a flow diagram of a method in accordance with the subject technology.

Referring now to FIG. 9, there is illustrated a flowchart depicting a process or method for creation of the COLI-DB product. At step 100, the method identifies suitable individuals to be insured, i.e., the insureds, wherein the policies are held in the COLI-DB Suitable individuals may be employees and/or non-employees that are be of a certain age status, certain standing/prominence in the company and the like.

At step 110, the method determines the life insurance policies that can be taken on the insureds. At step 120, the method optimizes a return of the COLI-DB. Optimization may include evaluation of contract premiums and death benefits associated with the policies. Optimization may also include choosing a discount factor for cashflows and evaluation of actuarial data. A discount factor can also be determined and incorporated into the COLI-DB. The method may iteratively recalculate the value of the COLI-DB with different values to determine an optimal return. At step 130, the COLI-DB is created in the system based upon the optimal return. At step 140, the death benefits are reinsured through a captive to further increase the return to the company already described above.

While the invention has been described with respect to preferred embodiments, those skilled in the art will readily appreciate that various changes and/or modifications can be made to the invention without departing from the spirit or scope of the invention as defined by the appended claims.

What is claimed is:

1. A server for creating a corporate owned life insurance (COLI) product for maximizing death benefits with cost efficient coverage, wherein the server comprises:
   (a) a memory storing an instruction set and data related to mortality rates, a plurality of individuals and associated premiums, interest rates, tax rates, duration of the COLI product, return on reserves, retirement age, and discount rates; and
   (b) a processor for running the instruction set, the processor being in communication with the memory, wherein the processor is operative to:
   (i) evaluate a corporate owned life insurance policy having death benefits (COLI-DB) to determine an estimated market value of the COLI-DB, the COLI-DB having a plurality of life insurance policies having insureds and having associated policy death benefits, wherein at least one insured is an employee of a company;
   (ii) optimize a return of the COLI-DB by:
   I) determining obtaining a schedule of contract premiums and death benefits associated with the policies;
   II) obtaining actuarial forces of mortality associated with the insureds;
   III) determining a discount factor for cashflows;
   IV) incorporating the discount factor into the COLI-DB; and
   V) recalculating the estimated market value of the COLI-DB based upon steps II)-IV); and
   (iii) determine an optimal COLI-DB based upon the recalculated estimated market value.

2. A server as recited in claim 1, wherein the processor is in communication with a distributed computing network having a plurality of client computers.

3. A method for maximizing death benefits with cost efficient coverage in a corporate owned life insurance product (COLI-DB) for a company comprising the steps of:
   (a) evaluating the COLI-DB to determine an estimated market value on a computer, the COLI-DB having a plurality of life insurance policies having insureds and an associated policy death benefit, wherein at least one insured is an employee of the company;
   (b) optimizing a return of the COLI-DB on the computer by:
   i) determining a schedule of contract premiums and death benefits associated with the policies;
   ii) obtaining actuarial forces of mortality associated with the insureds;
   iii) determining a discount factor for cashflows;
   iv) incorporating the discount factor into the COLI-DB; and
   v) recalculating the estimated market value of the COLI-DB based upon steps ii)-iv); and
   (c) creating the COLI-DB based upon the recalculated estimated market value.

4. A method as recited in claim 3, wherein choice of the discount factor is based on market rates for comparable counterparty risk and a risk premium for illiquidity.

5. A method as recited in claim 3, wherein the COLI-DB has premiums that are minimally funded to maintain the death benefits in force each year.

6. A method as recited in claim 5, wherein no premium is required at all subsequent to a first year target premium.

7. A method as recited in claim 5, wherein the death benefits include riders that increase each year with any premium paid plus interest.

8. A method as recited in claim 5, further comprising the step of choosing a highest interest rate for the interest.

9. A method as recited in claim 3, wherein the step of choosing the discount factor is based on credit risk, systematic risk, liquidity risk, and an adjustment related to a number of the insureds.

10. A method as recited in claim 9, wherein the step of choosing the discount factor based on credit risk includes a comparison to industry practices.

11. A method as recited in claim 9, wherein the step of choosing the discount factor based on credit risk includes analyzing a capital structure of a regulated life insurance operating company, imputing a riskiness, and pricing a rate based upon the riskiness of assets in the regulated life insurance operation company and a level of overcollateralization of policyholder reserves.

12. A method as recited in claim 9, wherein the step of choosing the discount factor based on systematic risk includes adjusting to reflect that the policies are senior to debentures issued into capital markets.

13. A method as recited in claim 9, wherein the step of choosing the discount factor based on liquidity risk includes adjustment downward by 15% for lack of liquidity.

14. A method as recited in claim 3, further comprising the step of using a corporate-owned captive company to reinsure a risk on a mortality risk on the COLI-DB.

15. A method as recited in claim 3, wherein a plurality of the insureds are denoted as key-men of the company.

* * * * *